United States Patent [19]

Girone

[11] 4,299,199

[45] Nov. 10, 1981

[54] METHODS OF AND APPARATUS FOR HEATING FLUID MATERIALS

[75] Inventor: Joseph M. Girone, Richmond, Va.

[73] Assignee: Process Engineering Incorporated, Richmond, Va.

[21] Appl. No.: 891,221

[22] Filed: Mar. 29, 1978

[51] Int. Cl.³ .............................................. F24J 3/02
[52] U.S. Cl. .............................. 126/420; 126/427; 126/437; 126/452
[58] Field of Search ............... 126/270, 271, 452, 419, 126/420, 415, 416, 437, 430, 900; 137/59–62; 417/14, 217; 128/900, 436, 437, 430

[56] References Cited

U.S. PATENT DOCUMENTS

| | | | |
|---|---|---|---|
| 3,262,493 | 7/1966 | Hervey | 126/271 |
| 3,991,742 | 11/1976 | Gerber | 126/416 |
| 4,027,821 | 6/1977 | Hayes | 126/271 |
| 4,117,678 | 10/1978 | Turner | 417/217 |
| 4,191,166 | 3/1980 | Saarem | 126/422 |
| 4,195,621 | 4/1980 | Firebaugh | 126/422 |

*Primary Examiner*—Samuel Scott
*Assistant Examiner*—G. Anderson
*Attorney, Agent, or Firm*—LeBlanc, Nolan, Shur & Nies

[57] ABSTRACT

Methods of and apparatus for maintaining fluid materials at selected bulk temperatures which employ solar energy as the primary heat source. The methods and apparatus may be used to, for example, protect fluids against freezing and to keep their viscosity from exceeding a predetermined level.

6 Claims, 1 Drawing Figure

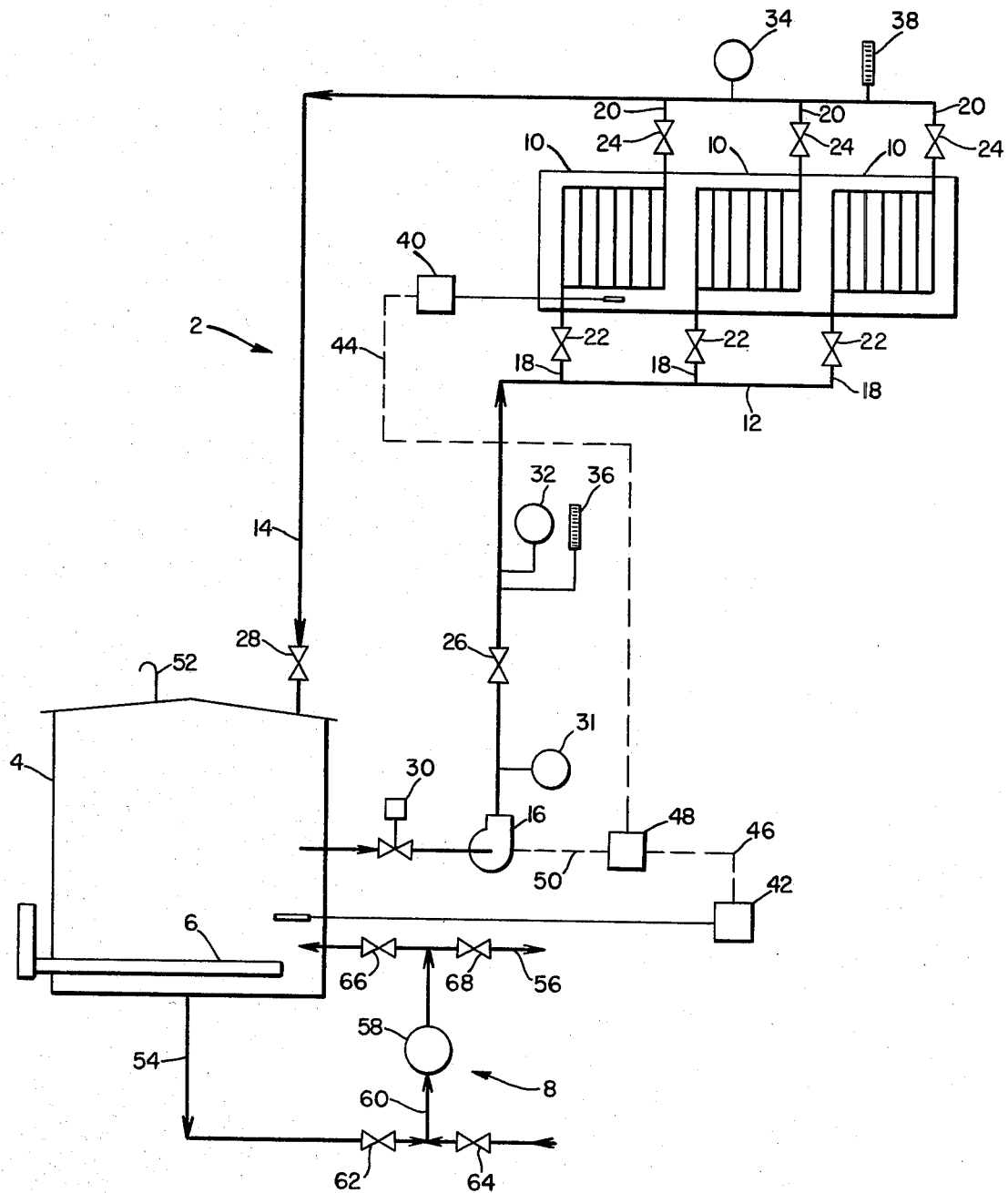

METHODS OF AND APPARATUS FOR HEATING FLUID MATERIALS

This invention relates to methods of and apparatus for heating a fluid material and thereby maintaining the temperature of the material at a specified level. More particularly, the present invention is concerned with methods and apparatus of the character just specified which employ solar energy to heat the fluid material.

Asphalt and other viscous materials are commonly stored in bulk form. It is often necessary to heat such materials on a periodic or even continuous basis to keep them fluid enough to be pumped or otherwise removed from the storage facility. Conventionally, electric, steam, or fossil fuel-fired direct or indirect heaters are employed for this purpose.

Conventional bulk storage heating systems are becoming increasingly expensive to operate. Also, the operation of such systems makes inroads on our dwindling supplies of fossil fuels.

I have now invented a novel system for maintaining the temperature of bulk stored viscous liquids at wanted levels which minimizes the just-discussed disadvantages of conventional systems by relying on solar energy as a substantial, if not the primary, heat source.

In general my novel bulk storage heating systems include bulk storage facility for the viscous material, solar collectors, and a system for circulating the hot, stored, otherwise viscous material from the storage facility to and through the collectors and then back to the storage facility. Provision is made for draining the circulation system when the available energy falls below a certain level or when a specified bulk storage temperature is reached and circulation of the stored material is halted so that the viscous material will not solidify in the collectors or the circulation system. I also preferably provide for the automatic start-up of the solar heating system when the availability of the solar energy reaches a usable level. A conventional heater, in some cases already existing, is employed as needed to supplement the heating available from the solar collectors.

The novel system and process just described can also be used to advantage in other applications—for example, to keep liquids from freezing. Liquid caustic, as one example, is often stored in bulk; and this material freezes or solidifies at 54° F., making it impossible to pump. Advantage can be taken of the present invention to protect caustic and other bulk stored fluids such as the water stored in fire protection tanks against freezing.

Solar heating systems as such are of course not new (see, for example, U.S. Pat. Nos. 3,799,145 issued Mar. 26, 1974, and 4,010,734 issued Mar. 8, 1977). However, I am not aware of solar heating having heretofore been used for the purposes described above.

Furthermore, most solar heating systems are of the indirect type in which an intermediate liquid such as a glycol is circulated through the solar collectors and then used to heat a primary liquid. Such systems are less efficient than the novel direct heating system I have invented. Also, leakage can result in contamination of the material being heated, an obvious disadvantage.

From the foregoing it will be apparent to the reader that one important, primary object of the present invention resides in the provision of novel, improved methods of and apparatus for maintaining the temperature of bulk stored fluid materials at predetermined levels.

A related and also important but more specific object of my invention resides in the provision of methods and apparatus in accord with the preceding object which are less expensive to operate than those of conventional character.

A further, related, and important object of my invention resides in the provision of methods and apparatus as described herein which consume smaller quantities of fossil fuels than those currently employed for the same purpose.

Yet another important, primary object of my invention is the provision of methods and apparatus for maintaining the temperature of bulk stored viscous materials which employ solar energy as a major, if not primary, heat source.

A further, also important and primary object of my invention resides in the provision of methods and apparatus for heating fluid materials and thereby protecting them against freezing which employ solar energy as a major, if not primary, heat source.

Still other important, but more specific, objects of my invention reside in the provision of methods and apparatus in accord with the preceding objects:

which are of the direct heating type;

which are efficient;

which do not pose a materials contamination problem.

And additional but more specific objects of my invention reside in the provision of direct type, solar systems for heating bulk stored, fluid materials:

in which provision is made for draining a system connecting a bulk storage facility for the material with solar collectors so that material being heated by circulating it from the storage facility to and through the solar collectors will not solidify in the circulation system or collectors when the available solar energy drops below a specified level or the specified bulk storage temperature is reached;

in which provision is made for automatically initiating the circulation of the material to and through the solar collectors when the available energy reaches the specified level;

which include an auxiliary system for supplementing the thermal energy available from the solar collectors.

Other important objects and features and additional advantages of my invention will become apparent from the appended claims and as the ensuing detailed description and discussion proceeds in conjunction with the accompanying drawing in which the single FIGURE is a schematic illustration of a system for maintaining the temperature of fluid materials; the system embodies and is constructed in accord with the principles of the present invention.

In the drawing the single figure depicts a solar heating system 2 for maintaining the temperature of a material at or above a specified level in accord with the principles of the present invention. The materials, for example a viscous fluid such as asphalt or one which freezes such as liquid caustic or water, is stored in bulk in a storage tank 4, which is also equipped with an auxiliary heater 6 and a system 8 for pumping the material into and out of, and circulating it within, tank 4.

The main solar heating system 2 includes solar collectors 10 connected into a closed circulation system with tank 4 via a main supply conduit 12 and a main return conduit 14 and a pump 16 for circulating the fluid material stored in tank 4 through that system.

The solar collectors 10, which may be of any desired construction, are connected in parallel between main conduits 12 and 14 by branch supply conduits 18 and branch return conduits 20. Valves 22 and 24 in the branch supply and return conduits permit the solar collectors to be isolated from the circulation system for maintenance, replacement, or other purposes. Valves 26 in conduit 12 and 28 in conduit 14 can be closed to isolate the entire circulation system.

In the interest of safety, a conventional safety valve 30 controlled by a pressure switch 31 is installed in main supply conduit 12 on the inlet side of circulation pump 16. Pressure gauges 32 and 34 and temperature gauges 36 and 38 in main supply and return lines 12 and 14 are preferably provided so that the operation of the system can be monitored.

The operation of pump 16 and, therefore, the circulation of the fluid material from tank 4 through line 12, solar collectors 10, and return line 14 is so regulated that circulation will be effected only if: (a) the temperature of the material falls below the wanted level, and (b) a selected, minimum level of solar energy is available. The operation of the pump is, furthermore, controlled such that, when the available energy falls below the minimum level, or the temperature in tank 4 reaches the specified level, pump 16 will stop and reverse, draining material in the solar collectors and various conduits of system 2 back into tank 4 and keeping the material from solidifying in the solar heating system.

The control components, all of which are conventional, include a first temperature sensor 40 responsive to the level of solar energy at collectors 10 and a second sensor 42 responsive to the bulk temperature of the material in tank 4. As indicated by dotted lines 44 and 46, temperature sensors 40 and 42 are connected to a standard controller 48 which controls the operation of the motor (not shown) of pump 16 as indicated by dotted line 50.

Pump 16 remains deenergized until both of the conditions identified above are satisfied; i.e., until a minimum level of solar energy is available at collectors 10 and the bulk temperature in tank 4 is below the selected level. When these two conditions coincide, controller 48 energizes pump 16, causing the latter to circulate fluid material from tank 4 through conduits 12 and 18 to collectors 10 to heat the material and then through conduits 20 and 14 back to tank 4.

This continues until the temperature in tank 4 reaches the selected level or the energy at the collectors drops below the specified level. The occurrence of one of the foregoing, detected by sensor 40 or sensor 42, results in controller 48 reversing the rotation of the circulation pump motor. Pump 16 then pumps the fluid material present in the collectors and in the various conduits back into tank 4 through conduit 12. This operation is facilitated by vent 52 on tank 4, which eliminates the need for venting the main, solar heating system 2 while it is being drained.

The operation of pump 16 to drain system 2 can be terminated manually or automatically by connecting to controller 48 a timer or a sensor responsive to the pressure or presence or absence of fluid in conduit 12. As both the techniques and hardware for so automating the operation of pump 16 are well-known, and as they are not part of the present invention, they have not been shown in the drawing and will not be discussed in detail herein.

Nor is it considered necessary to describe auxiliary heater 6 in any detail as it, too, will be of conventional construction. As discussed above, such systems of various types are available.

The final major system of the installation illustrated in the drawing is that identified by reference character 8 and discussed briefly above. This system includes a supply-recirculation conduit 54, a discharge conduit 56, and a pump 58 connected between conduits 54 and 56 by conduit 60. Valves 62 and 64 are installed in conduit 54 on opposite sides of conduit 60, and valves 66 and 68 are installed in a similar manner in conduit 56.

The fluid material is supplied to tank 4 by closing valves 62 and 68, opening valves 64 and 66, and energizing pump 58 (typically manually) to pump the material from a source (not shown) through conduits 54, 60, and 56 into the tank.

The material can be withdrawn by opening valves 62 and 68, closing valves 64 and 66, and energizing the pump. In this circumstance the material is withdrawn through line 54 and pumped through line 60 into discharge unit conduit 56.

System 8 also permits fluid material in tank 4 to be withdrawn and recirculated in the interest of promoting a uniform bulk temperature in the storage tank. To recirculate the material, valves 62 and 66 are opened, valves 64 and 68 closed, and pump 58 energized. The fluid material is then withdrawn through conduit 54 and pumped through conduits 60 and 56 back into the storage tank.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A system for maintaining a bulk stored fluid material at a preselected temperature which comprises: bulk storage means; solar collector means; means including a first pump means and first conduit means for circulating the fluid material from said storage means and to and through said solar collector means; control means for terminating the circulation of fluid material and then effecting the draining of said conduit means and said solar collector means when the availability of solar energy falls below a selected level in order to keep the material from solidifying in said solar collector means, first pump means and first conduit means, said control means also having means for automatically initiating the circulation of the fluid material to said solar collector means when the availability of solar energy reaches said selected level; auxiliary heating means for the fluid material in said bulk storage means for supplementing the energy made available to the fluid material via said solar collector means to maintain the fluid material at said preselected temperature; and recirculating means, separate and distinct from said solar collector means, first pump and first conduit means, comprising a second pump and second conduit means for periodically circulating fluid from said storage means through said second pump and back to said storage means to thereby assure an even temperature throughout the quantity of fluid material in said storage means.

2. A system as defined in claim 1 wherein said recirculating means further comprises inlet means for supplying said storage means with fluid material and discharge means for emptying said storage means of fluid material.

3. A system as defined in claim 1 in which said control means also comprises means operable when the bulk temperature of the fluid material in the storage means reaches a selected level to terminate the circulation of the material to said solar collector means and to then effect the draining of the conduit means and the solar collector means.

4. A system as defined in claim 1 wherein the means for draining the conduit means and the solar collector means comprises said pump means and means for so effecting the operation of said pump as to reverse the circulation of said fluid material from said solar collector means through said conduit means.

5. A method of maintaining the temperature of a fluid material at or above a selected level within a bulk storage facility, said method comprising the steps of: circulating said material through a conduit system from the bulk storage facility to and through a solar collector and then back to said storage facility; terminating said circulation when the energy available from said collector falls below a selected level or when the temperature of the liquid in the storage facility reaches a selected level; returning essentially all of the fluid material to the bulk storage facility concomitantly with the termination of circulation to thereby keep said material from solidifying in said solar collector or said conduit system; and periodically draining fluid from said storage facility and reintroducing the fluid into said storage facility to assure a uniform temperature throughout the quantity of fluid within said storage facility.

6. A method as defined in claim 5 together with the step of utilizing an auxiliary heater to augment the thermal energy available from the solar collector.

* * * * *

UNITED STATES PATENT AND TRADEMARK OFFICE
CERTIFICATE OF CORRECTION

PATENT NO. : 4,299,199
DATED : November 10, 1981
INVENTOR(S) : Joseph A. Girone

It is certified that error appears in the above-identified patent and that said Letters Patent are hereby corrected as shown below:

Column 4, line 22, cancel "unit".

Signed and Sealed this

Ninth Day of February 1982

[SEAL]

Attest:

Attesting Officer

GERALD J. MOSSINGHOFF

Commissioner of Patents and Trademarks